Feb. 16, 1932.  E. F. GUTH  1,845,084

LUBRICATING DEVICE FOR MOTORS

Filed Dec. 30, 1929

INVENTOR
*Edwin F. Guth*

BY *Harry Lea Dodson*

ATTORNEY

Patented Feb. 16, 1932

1,845,084

UNITED STATES PATENT OFFICE

EDWIN F. GUTH, OF WEBSTER GROVES, MISSOURI

LUBRICATING DEVICE FOR MOTORS

Application filed December 30, 1929. Serial No. 417,343.

This invention relates to electric motors, and more specifically to those which are termed vertical motors, i. e. those wherein the armature shaft is vertical instead of horizontal.

My invention has for its object, to provide a lubricating device which will maintain a constant flow of lubricant at all times.

My invention has for its further object, to provide a lubricating device in which it will be practically impossible for appreciable leakage of oil to occur.

My means for accomplishing the foregoing objects may be more readily understood by reference to the accompanying drawings, which are hereto annexed and are a part of this specification, in which—

Figure 1:
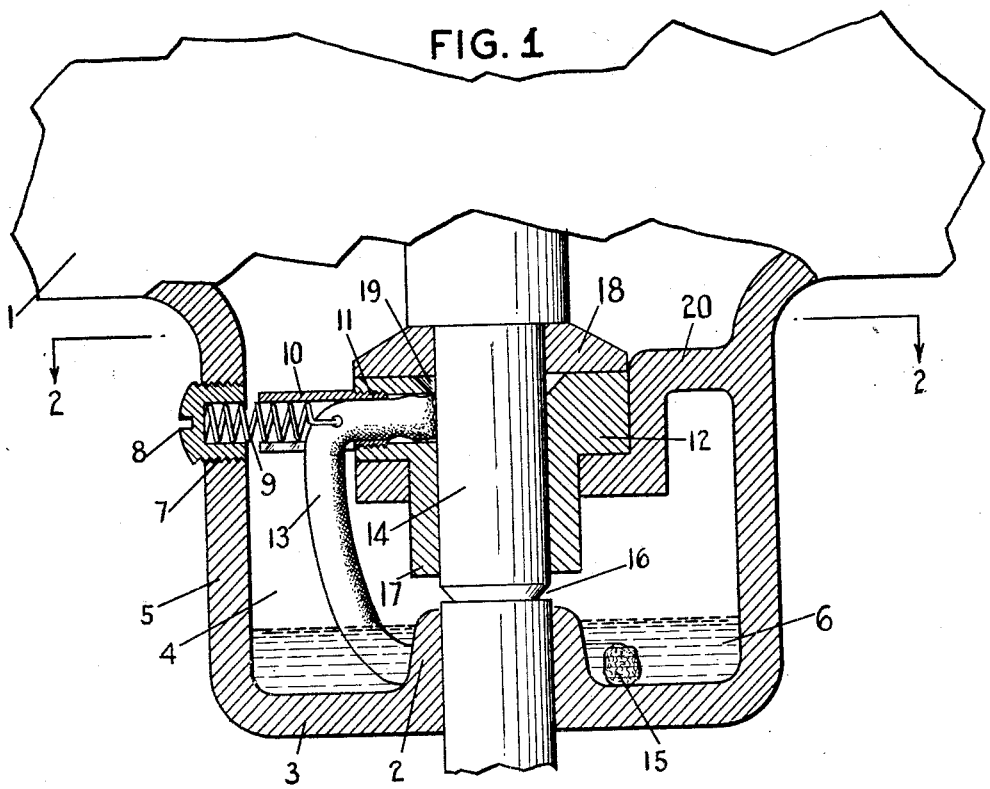
Figure 2:
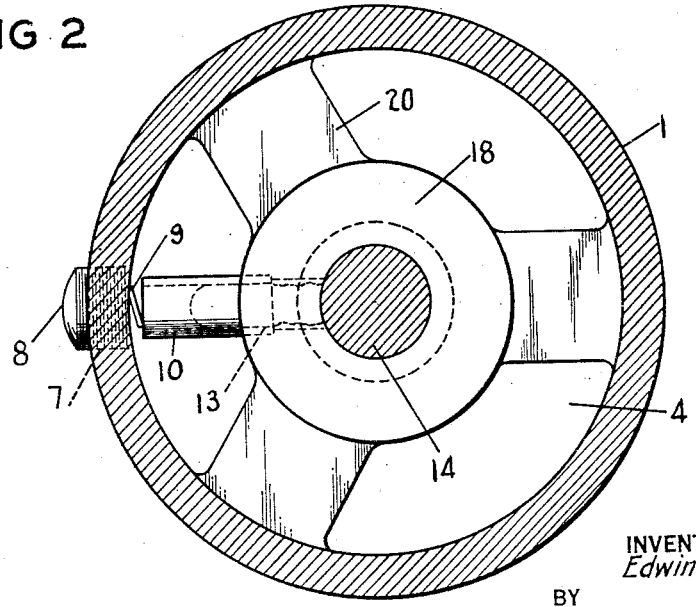

Fig. 1 is a vertical section through the bearing end of a motor having a vertical drive shaft, only a fragmentary part of the motor casing being shown, as obviously the motor forms no part of my invention; and Fig. 2 is a cross-section, on the line 2—2 in Fig. 1.

Similar reference numerals refer to similar parts throughout the entire description.

As shown in the drawings, the motor casing or housing 1 is constructed with a hub or boss 2, which extends upwardly from the bottom wall 3 of the housing 1. The annular space 4 between the hub 2 and the wall 5 of the housing 1, forms an oil chamber. The level of the oil 6 should never reach the top of the hub 2. Provision is made for filling this oil chamber 4, by means of an opening 7 in the wall 5 of the motor housing 1. The opening 7 is closed by a large plug 8. This plug 8 carries a coil spring 9, which extends into a slotted tube 10, one end 11 of which is screwed into a bronze bearing bushing 12. The inner end of the spring 9 engages a wick 13, one end of which is pressed by the spring 9 against the motor shaft 14. The other end 15 of the wick 13 depends downwardly into the oil 6 in the oil chamber 4, so that by capillary action the lubricant will be carried up through wick 13, and thoroughly lubricate the shaft 14.

I am aware that it is common practice to use a spring-pressed wick to lubricate horizontal shafts, but this alone will not serve when the shaft is vertical, as constant oil leakage occurs down the shaft. I avoid this by forming an oil-slinging ring 16 just below the end 17 of the bronze bearing bushing 12. This ring is formed by a shoulder turned on the shaft. I arrange for the proper lubrication of the end thrust bearing 18 by forming a groove 19 in the bronze bearing bushing 12, which will permit the lubricant to collect there from the wick 13. This oil 6 is then thrust outwardly by centrifugal force, which will carry the lubricant 6 over the entire surface of the end thrust bearing 18.

The bronze bearing bushing 12 is held in position by a web 20, formed in the interior of the housing 1. The provision of the large plug 8 permits the removal of the spring 9 and wick 13 when the oil chamber 4 is to be filled. The spring 9 and wick 13 are then readjusted, ensuring the proper amount of compression of the wick 13 against the shaft 14.

It may be found desirable in practice, under some conditions, to provide a second wick, which can be mounted on the opposite side of the shaft 14, employing similar construction.

Having described my invention, what I regard as new, and desire to secure by Letters Patent of the United States, is:

1. A lubricating device, comprising a motor housing, a vertical shaft mounted therein, an element of an end thrust bearing thereon, a bearing against which said element abuts, there being an annular groove at the upper inner edge of said housing, an oil chamber in said housing, a wick which extends from said chamber and abuts said shaft adjacent said groove, to lead oil to said groove whence it is thrust outwardly intermediate said element and said bearing, and spring means to hold said wick against said shaft.

2. A lubricating device comprising a motor housing, a vertical shaft mounted therein, an element of an end thrust bearing thereon, a bearing against which said element abuts, there being an annular groove at the upper inner edge of said bearing, an oil chamber in said housing, a wick which extends from said chamber and abuts said shaft adjacent said groove, to lead oil to said groove whence it is thrust outwardly intermediate said element and said bearing, spring means to hold said wick against said shaft, and an oil-slinging shoulder on said shaft below said bearing.

3. A lubricating device, comprising a motor housing, a vertical shaft mounted therein, an element of an end thrust bearing thereon, a bearing against which said element abuts, there being an annular groove at the upper inner edge of said bearing, an oil chamber in said housing, a wick which extends from said chamber and abuts said shaft adjacent said groove, to lead oil to said groove, whence it is thrust outwardly intermediate said element and said bearing, spring means to hold said wick against said shaft, means to adjust the tension of said spring, and an oil-slinging shoulder on said shaft below said bearing.

4. A lubricating device, comprising a motor housing, a vertical shaft mounted therein, an element of an end thrust bearing thereon, a bearing against which said thrust element abuts, there being an annular groove at the upper inner edge of said bearing, an upwardly extending hub on the bottom wall of said housing, which forms an oil chamber, a wick which extends from said chamber and abuts said shaft adjacent said groove, to lead oil to said groove whence it is thrust outwardly by centrifugal force intermediate said element and said bearing, a spring to hold said wick against said shaft, means to adjust the tension of said spring, and an oil-slinging shoulder on said shaft below said bearing.

5. A lubricating device, comprising a motor housing, having a threaded opening in the side wall thereof, a vertical shaft mounted in said housing, an element of an end thrust bearing thereon, the bearing against which said thrust element abuts, there being an annular groove at the upper inner edge of said bearing, an upwardly extending hub on the bottom wall of said housing, which forms an oil chamber, a wick which extends from said chamber and abuts said shaft adjacent said groove, to lead oil from said chamber, to said groove whence it is thrust outwardly by centrifugal force between said element and said bearing, means to hold said wick against said shaft and means on said shaft located below said bearing to throw the oil outwardly from said shaft.

EDWIN F. GUTH.